United States Patent [19]
Schmidt et al.

[11] Patent Number: 5,604,476
[45] Date of Patent: Feb. 18, 1997

[54] PROTECTIVE DEVICE FOR AN ELECTRICAL CONSUMER

[75] Inventors: Wolfgang Schmidt, Berg; Ulrich Reichert; Fritz Krasser, both of Altdorf; Frank Tolksdorf, Hagen; Stephan Greitzke, Dortmund; Hansjuergen Kech, Herdecke, all of Germany

[73] Assignees: Ellenberger & Poensgen GmbH, Altdorf; Wilo, GmbH, Dortmund, both of Germany

[21] Appl. No.: 381,908

[22] PCT Filed: Aug. 9, 1993

[86] PCT No.: PCT/DE93/00712

§ 371 Date: Feb. 13, 1995

§ 102(e) Date: Feb. 13, 1995

[87] PCT Pub. No.: WO94/05030

PCT Pub. Date: Mar. 3, 1994

[30] Foreign Application Priority Data

Aug. 11, 1992 [DE] Germany ............... 92 10 707.9 U
Nov. 11, 1992 [DE] Germany ............... 92 15 345.3 U
Jan. 25, 1993 [DE] Germany ............... 43 01 958.7

[51] Int. Cl.$^6$ .................................................. H01H 37/00
[52] U.S. Cl. ................................................. 337/298; 337/100
[58] Field of Search .............................. 337/100, 102, 337/107, 377, 378, 36, 88, 112, 354, 401, 298

[56] References Cited

U.S. PATENT DOCUMENTS

| 3,019,319 | 1/1962 | Anderson . |
| 3,636,426 | 1/1972 | Buiting . |
| 3,893,054 | 7/1975 | Marcoux et al. . |
| 4,281,358 | 7/1981 | Plouffe et al. . |

FOREIGN PATENT DOCUMENTS

| 0004842 | 10/1979 | European Pat. Off. . |
| 533139 | 9/1926 | Germany . |
| 3337738 | 4/1984 | Germany . |
| 3442472 | 5/1986 | Germany . |
| 9107139.9 | 7/1992 | Germany . |

OTHER PUBLICATIONS

O. Fleig "Proper Protection for LV Motors" In: Siemens Energy & Automation, vol. IX, No. 1, Apr. 1, 1989, Berlin, DE, pp. 18–22.

Primary Examiner—Lincoln Donovan
Attorney, Agent, or Firm—Spencer & Frank

[57] ABSTRACT

A protective device for an electrical consumer disposed in a consumer circuit. The protective device has sensor elements for detecting an operating state of the electrical consumer, and an electronic evaluation and control unit operatively connected to the sensor elements for evaluating and controlling the operating state of the electrical consumer detected by the sensor elements. The protective device further includes a protective switch responsive to the operating state of the electrical consumer for interrupting the consumer circuit. The protective switch comprises a control circuit including a bimetallic strip and a temperature-dependent resistor for deflecting the bimetallic strip for interrupting the consumer circuit, the bimetallic strip thereby defining a deflecting direction. The protective device further includes a power supply unit for supplying electrical power to the sensor elements, the evaluation and control unit and the protective switch. The improvement of the protective device pertains to a protective switch which further comprises a spring disposed for biasing the bimetallic strip and the temperature-dependent resistor toward one another in the deflection direction of the bimetallic strip. The spring effects a structural and electrical contact between the bimetallic strip and the temperature-dependent resistor. The bimetallic strip is thereby electrically connected in series with the temperature-dependent resistor, and a control current is therefore able to flow through the temperature-dependent resistor and the bimetallic strip.

30 Claims, 8 Drawing Sheets

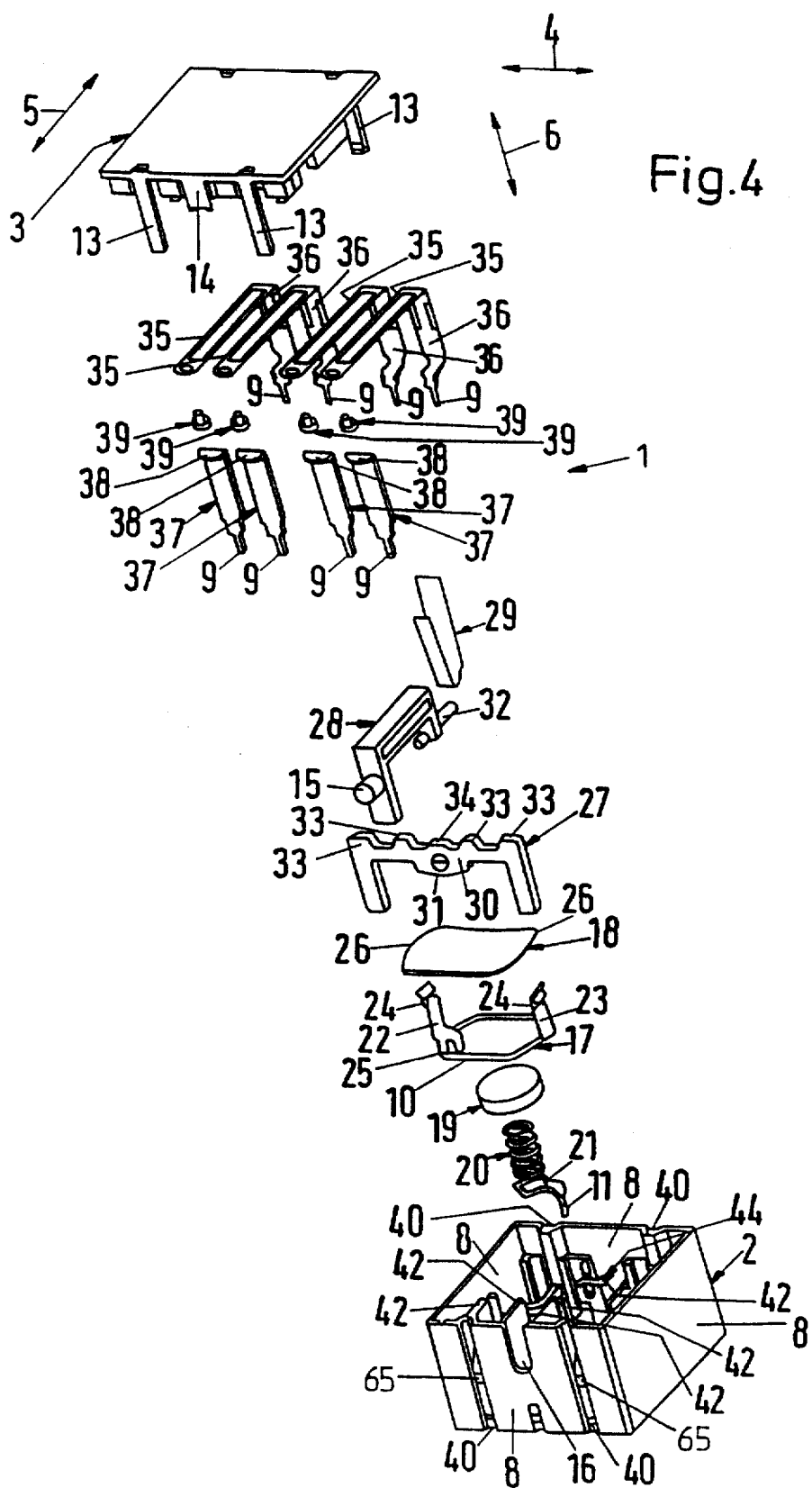

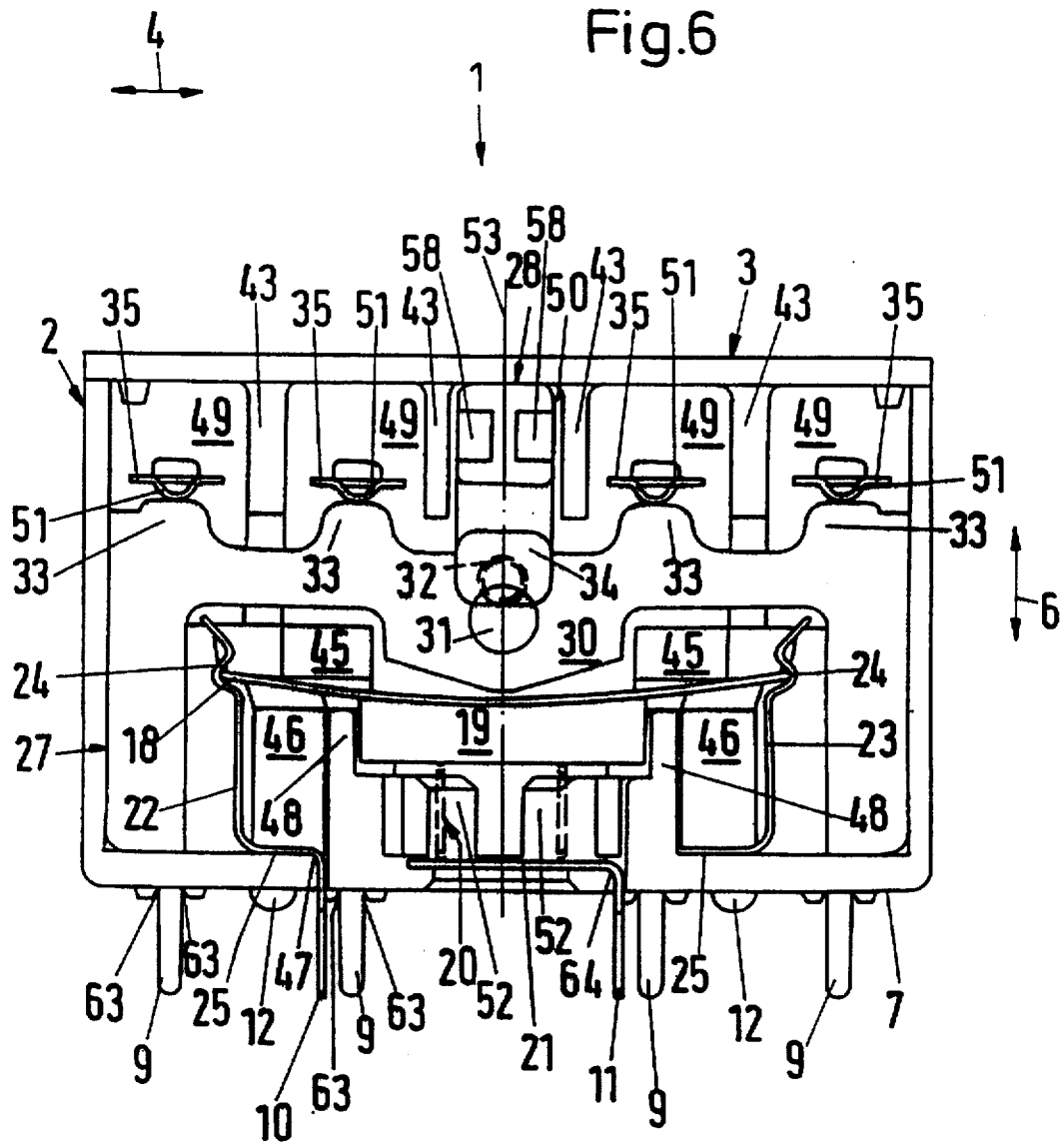

PROTECTIVE DEVICE FOR AN ELECTRICAL CONSUMER

The invention relates to a protective device for an electrical consumer disposed in a consumer circuit. The protective device has sensor elements for detecting an operating state of the electrical consumer, and an electronic evaluation and control unit operatively connected to the sensor elements for evaluating and controlling the operating state of the electrical consumer detected by the sensor elements. The protective device further includes a protective switch responsive to the operating state of the electrical consumer detected by the sensor elements for interrupting the consumer circuit. The protective switch comprises: a housing and a control circuit disposed at least in part within the housing and including a bimetallic strip and a temperature-dependent resistor operatively associated with the bimetallic strip for deflecting the bimetallic strip for interrupting the consumer circuit, the bimetallic strip thereby defining a deflecting direction. The protective device further includes a power supply unit adapted to be connected to a power supply grid and to respective ones of the sensor elements, the evaluation and control unit, and the protective switch for supplying electrical power to the sensor elements, the evaluation and control unit and the protective switch.

Protective devices of this kind are known in the industry in highly modified versions. The technical principle can be described as follows: The switch acts as an interface between a consumer circuit and a control circuit. As a function of a measured physical variable within the operating state of the electrical consumer, a control device with a sensor outputs an electrical measurement signal to the control circuit. The control circuit in turn experiences a flow of a control current that is variable as a function of the measurement signal.

The physical variable—such as current, water level, temperature, pressure, acceleration and the like—can be measured at the electrical consumer connected into the consumer circuit. Alternatively, it may be an extreme physical variable, such as the current of the other circuit or the ambient temperature. If a limit value for the electrical measurement signal is exceeded, the switch, utilizing the deflection force of the bimetallic strip, interrupts the current lines of the electrical consumer. This is intended to protect the consumer against damage from the effect of certain physical variables.

Protective devices of the type described above serve for instance to monitor electrical rotary pumps, which are used in a heating, fresh water or service water system. As a rule, the operating states of the electrical consumers that are essential to the particular operating state of the pump are monitored. The winding temperature of a motor, for instance, has a definitive influence on its service life. High winding temperatures cause premature destruction of the motor. In known protective devices the motors therefore shut off, in the case of measured temperatures in excess of a given temperature limit value.

German Utility Model DE 91 07 139 U1 discloses such a protective device for monitoring the winding temperature of electric motors. The protective device has a protective switch with stationary and movable contacts for switching the power supply connections of the electrical consumer. The switching events of the protective switch are controlled by a control device. The control device essentially includes a control circuit. A temperature probe that monitors the winding temperature of the electric motor is electrically connected to the control circuit. The control circuit also contains a positive temperature coefficient (PTC) resistor for heating a bimetallic disk disposed in the protective switch.

The temperature probe functions as a sensor and outputs an electrical measurement signal to the control circuit. If a temperature limit value is exceeded, the electrical measurement signal is high enough to switch a semiconductor switch in the conducting direction and thereby cause a control current to flow through the aforementioned PTC resistor to heat the resistor. The PTC resistor is fixed in stationary fashion inside the protective switch. A heating of the PTC resistor in time leads to the heating of the bimetallic disk which is spaced apart from and parallel to the PTC resistor. The disk, by its deflection force, opens the contacts of the current lines of the electrical consumer.

Such a control circuit, with a sensor that outputs an electrical measurement signal, converts a physical variable—in this case the winding temperature—into a switching motion of the bimetallic element in a simple way. This conversion is done solely by means of the electronic components. Since the components are available as mass produced items, this kind of control device can be produced economically. Because of the electronics used, such control devices can also be integrated into the protective device in a way that needs little space.

The bimetallic disk in the known protective device acts solely as a mechanical component, however. Its deflection is therefore possible only as a result of the indirect heating by the PTC resistor. Because of the physical properties of the bimetallic element, however, this kind of heating results in unsatisfactory, very long response times of the protective device. Since the PTC resistor is fixed in stationary fashion, the bimetallic disk, if its freedom of motion during the switching events of the protective switch is to be assured, must be located a minimum distance away from the PTC resistor. Yet this increases the expense for the construction of the protective switch as well as the number of components to be used. Moreover, a gap present between the PTC resistor and the bimetallic disk means that a considerable portion of the thermal energy generated by the PTC resistor is given up to the interior of the protective switch. This further delays adequate heating of the bimetallic disk, and hence lengthens the response time of the protective device still further. An adequate, reliable protective action of the known protective device is thus not possible. To attain an improved response time with a protective device designed structurally as described above would require the use of correspondingly higher-quality and hence more-expensive components.

To overcome the disadvantages described above, the object of the invention is to design a protective device with a compact structure and small dimensions and to produce the device economically by simple means. Furthermore, the protective device should offer increased safety against an overload of the electrical consumer.

SUMMARY OF THE INVENTION

This object is attained by the improvement wherein the protective switch further comprises a spring disposed for biasing the bimetallic strip and the temperature-dependent resistor toward one another in the deflection direction of the bimetallic strip. The spring effects a structural and electrical contact between the bimetallic strip and the temperature-dependent resistor. The bimetallic strip is thereby electrically connected in series with the temperature-dependent resistor, and a control current is therefore able to flow through the temperature-dependent resistor and the bimetallic strip.

The spring pressure operative in the deflection direction of the bimetallic strip reinforces the deflection motion of the bimetallic strip. As a result, the activation position of the bimetallic strip for tripping the protective switch is attained within a shorter time.

Because of the special disposition of the bimetallic strip and the temperature-dependent resistor, the control current is utilized in two ways. First, the control current flows through the temperature-dependent resistor and thereby causes indirect heating of the bimetallic strip. Second, the control current also flows through the bimetallic strip itself and thereby causes intrinsic heating of the bimetallic strip. Overall, the result is faster heating of the bimetallic strip and hence a still further shortened response time of the protective switch.

Since the contact between the resistor and the bimetallic strip is both mechanical and electrical in nature, any expenditure for wiring between the components within the switch housing can be dispensed with. The above saves both labor time and costs in producing the protective switch. Since separate electrical connecting wires or stranded cables are not needed, any and all protective provisions within the housing to protect the electrical connections against mechanical damage are also dispensed with. Moreover, the above arrangement precludes the danger of short-circuiting or an unintended interruption of the control circuit from mistakenly ripping out connecting wires from the soldering points. This makes the protective switch safer and more reliable in operation. Because of the desired mechanical and electrical contacting between the components, any special protective measures to shield the components from one another are unnecessary as well. This further simplifies the structure of the protective switch.

In accordance with one embodiment of the invention, it is possible to draw the requisite supply voltage for the power supply unit of the protective device directly from the connection terminals of the motor. Using a PTC resistor makes it possible to use the protective device according to the invention within a wide operating voltage range. This makes the protective device according to the invention highly versatile. For instance, the same protective device can be operated not only for supply voltages in the range between 100 V and 400 V but can also be operated even in the absence of phase voltage or with asymmetrical phase voltage and with different voltage forms, such as those involved in phase-controllable or frequency converter-supplied motors.

Because of the independence of the supply or terminal voltage, the protective device can further be associated spatially with the motor and thus integrated into the motor terminal box itself. This considerably lowers the effort and expense for assembly and wiring when the protective device according to the invention is manufactured.

If the protective device of the invention is used in an electric motor, then for the reasons given above the sensor should detect the temperature of the electrical consumer, and in particular the winding temperature of a motor.

Another measure of the operating state of an electrical consumer is its current consumption. A sensor monitoring an electrical consumer can therefore be used that is embodied as a shunt, Hall element or current transformer for detecting the current consumed by the electrical consumer.

According to yet another embodiment of the invention, a protective device that is simple to install is created by connecting the sensor to a microprocessor or ASIC for outputting the signal to shut off the electrical consumer.

According to a further embodiment of the invention, the protective switch should have one additional contact by way of which a warning signal can be tripped when the protective switch is tripped. In that case it is possible in an uncomplicated way to trip an acoustical or optical signal simultaneously with the turn-on or turn-off of the electrical consumer.

An arrangement of a resistor and bimetallic strip according to another embodiment of the invention, where the bimetallic strip rests directly on the temperature-dependent resistor is suitable for good electrical contact pressure. Moreover, this arrangement enables the direct output of heat energy to the bimetallic strip without any intermediate medium, thereby further shortening the response time of the bimetallic strip.

The use of a PTC resistor as the temperature-dependent resistor relates to a preferred embodiment of the temperature-dependent resistor used in the protective switch. PTC resistors are usually made in disk form and are therefore effectively suitable for both mechanical and electrical contacting with the bimetallic strip. Because of its current-limiting action, the PTC resistor protects the control circuit against excessively high control currents. All the components of the control circuit are thereby protected against damage from excessive heating by the control current. This favors the reliable operation of the protective switch.

The special mechanical arrangement of the resistor and bimetallic strip where the resistor and the bimetallic-strip have substantially parallel surfaces increases the mutual electrical contact area and thus without additional electrical contacting means assures a reliable electrical contact between the two components. This arrangement moreover favors the compact, space-saving design of the switch housing.

According to another embodiment of the invention, the compression spring that reinforces the deflection motion of the bimetallic strip is also operative as an electrical component of the control circuit by electrically contactingly abutting a surface of the temperature-dependent resistor. Thus the compression spring has both a mechanical and an electrical function. The above arrangement economizes on the use of components inside the protective switch and, in turn lowers the costs of the protective switch and reinforces the space-saving design of the switch housing.

According to yet another embodiment of the invention, the compression spring is also used as a direct electrical connection between a connection contact of the control circuit and the bimetallic strip. As a result, the control circuit is closed inside the protective switch with a minimum of components. The above has a favorable effect on the desired space- and expense-saving design of the protective switch.

The special embodiment of the compression spring moreover assures a permanently effective contact pressure between the compression spring, resistor and bimetallic strip, so that transition resistances between these components that negatively affect the control current are avoided. Hence the control current generated by the control device connected to the protective switch is not falsified. In this way an accurate mode of operation of the protective switch is assured. The mutual disposition of the three aforementioned components further promotes the space-saving design of the protective switch.

According to a further embodiment of the invention, the bimetallic strip is supported mechanically stably in the switch housing. Supporting the opposed sides of the bimetallic strip in a manner fixed to the housing has the effect that when the control current is present, essentially only the middle region of the bimetallic strip, located between the side ends, is deflected. In an embodiment where the resistor contacts the bimetallic strip at the middle region thereof, a compression spring resting on the resistor would, because of the disposition of the resistor, effectively and additionally reinforce the deflecting motion of the bimetallic strip. The above arrangement would further shorten the response time of the protective switch.

Because of the central disposition of the resistor in the middle region of the bimetallic strip, mechanically stable deflection and displacement motions of the components are attained. The requirements for an especially embodied housing interior for guiding the motion of the bimetallic strip, resistor and/or compression spring are therefore lower. The above has the effect of saving expense in the production of the entire protective switch.

According to another embodiment of the invention, the protective switch further includes two spring tongues disposed at respective ones of two diametrically opposed sides of the bimetallic strip. The tongues exert diametrically opposed spring pressure on the diametrically opposed sides of the bimetallic strip for retaining the bimetallic strip within the housing of the protective switch. The bimetallic strip is thus effective as a snap disk. As a result, two defined positions of the bimetallic strip are attained, namely the activation position and the resting position. This reinforces the reliable mode of operation of the protective switch.

The spring tongues according to another embodiment of the invention extend from a contact bracket disposed within the housing of the protective switch. The tongues therefore perform a dual function as a mechanical and electrical component, thereby further economizing on components. Since the bimetallic strip can be retained at the spring tongues, a direct electrical contacting is achieved between the bimetallic strip and the contact bracket. The electrical contacting dictated by the mechanical support also has the effect of reducing the effort for installing the components inside the protective switch.

According to another embodiment of the invention, each of the two spring tongues includes a notch-shaped side region, and the two diametrically opposed sides of the bimetallic strip are blade-like and rest within respective ones of the notch-shaped side regions of the two spring tongues. This knife-blade support is known from *Bauelemente der Feinmechanik*, that is, *Precision Mechanical Components*, by Richter, Voss, and Kozer, published by VEB Verlag Technik Berlin, 1964, 9th edition, pp. 229, and is employed, with all its advantages, for supporting the bimetallic strip. This creates an effective fixation of the diametrically opposed end regions of the bimetallic strip.

According to a preferred embodiment of the invention, the consumer circuit includes at least one contact bridge and a contact element associated therewith. The contact bridge is biased in a contact closing direction for establishing contact with the contact element for effecting a consumer current flow in the consumer circuit, the contact closing direction being opposite to the deflection direction of the bimetallic strip. The contact bridge thus defines a contact closing position and is disposed such that a deflection of the bimetallic strip in the deflection direction disengages the contact bridge from the contact element whereby the contact bridge is moved into a contact opening position, the deflection direction of the bimetallic strip thus corresponding to a contact opening direction of the contact bridge. The above arrangement allows the interruption of the consumer circuit with the aid of the bimetallic strip.

Since the contact bridge is under spring pressure in the contact closing direction, the consumer circuit is securely closed when the bimetallic strip is not deflected.

The protective switch further includes a slide disposed between the bimetallic strip and the contact bridge for transmitting a deflection of the bimetallic strip to the contact bridge, the slide thereby having a contact opening position corresponding to the contact opening position of the contact bridge. The above arrangement enables effective transmission of the force of the deflection motion of the bimetallic strip for interrupting the consumer circuit.

According to another embodiment of the invention, the slide is supported on the housing of the protective switch and thus executes defined thrusting motions inside the switch housing. The above arrangement precludes unintentional incorrect motions and the resultant possible damage to other components. The displaceable support of the slide also reinforces the effective transmission of force of the deflection motion of the bimetallic strip.

according to one embodiment of the invention the directions of motion of many components are the same during their deflection, the tripping mechanism of the protective switch can be accomplished with very little expenditure for components. Because of the small number of components, the tripping mechanism is also technically uncomplicated. This in turn decreases the vulnerability of the protective switch to malfunction.

The matching directions of motion are a prerequisite for the narrow structure of the protective switch.

According to a preferred embodiment of the invention contact bridge biased in the contact closing direction, so that when the bimetallic strip is not deflected, the consumer circuit within the protective switch remains reliably closed.

According to another embodiment of the invention, the contact spring is securely fixed inside the protective switch housing. The contact spring can therefore execute only the desired displacement motions in the contact closing and contact openings directions. The above arrangement prevents an undesirable influence on other components.

According to yet another embodiment of the invention, the protective switch includes a plurality of contact bridges disposed side by side, the protective switch thereby being a multi-pole protective switch. The contact bridges are capable of being disengaged in unison from corresponding contact elements thereof by the slide as previously defined. The above arrangement is suitable not only for single-phase but also multi-phase types of current. It is also conceivable that a plurality of single-phase consumer circuits operating independently of one another should be interrupted in common. The multi-pole protective switch is likewise suitable for this purpose.

A parallel geometrical disposition of contact bridges present inside the protective switch of claim 24 in turn reinforces the narrow structure of the protective switch. Moreover, the above arrangement simplifies the use of a single, structurally simply designed slide to transmit its thrusting motions to all the contact bridges of the protective switch. The above in turn has a cost- and space-saving effect on the structural design of the entire protective switch.

According to a preferred embodiment of the invention, the protective switch further includes a locking device operatively associated with the contact bridge and the slide as previously defined. The locking device can move in a locking direction into a locking position for keeping the contact bridge and the slide in their contact opening positions after the contact bridge and the slide have been moved into their contact opening positions. The protective switch further includes a lock spring operatively associated with the locking device for biasing the locking device into its locking position. Moreover, the slide may define a slide recess therein for receiving the locking device; and the locking device may be a lock pin supported on the housing and adapted to be received within the slide recess when the lock pin is in its locking position. The locking device has the effect that the slide, when the protective switch is tripped, reliably keeps the contact bridge in its contact openings position. Without additional unlocking provisions, mistaken closing of the consumer circuit and attendant possible damage to or destruction of the electrical consumer is avoided in this way.

According to other preferred embodiments of the invention, the lock spring is a leaf spring supported on one of the housing walls of the housing. Moreover, the lock pin as previously defined may include a first end disposed adjacent the slide and a second end disposed opposite the first end. The lock spring may further be configured to be U-shaped and to include a first leg and a second leg. The lock spring may then be fastened on one of the housing walls at an outer side of the first leg thereof, and further be adapted to contact the second end of the lock pin at an outer side of the second leg thereof. This kind of lock spring rests inside the switch housing in a space-saving way, and therefore reinforces the narrow design of the protective switch. Because of its structurally simple design, the lock spring also contributes to keeping the technical expense for the locking device low.

According to a preferred embodiment of the invention, one of the housing walls defines an opening therein; and the protective switch includes: a cantilever operatively connected to the lock pin and extending at approximately right angles from the locking direction thereof, and a pressure tappet having a pushbutton oriented in the locking direction and protruding from the opening of the housing wall such that a pushbutton actuation thereof unlocks the lock pin from its locking position and thereby compresses the lock spring. The above preferred embodiment of the locking device enables an operator to manually re-close the consumer circuit after the protective switch has been tripped.

The subject of the invention will be described in further detail in terms of the exemplary embodiments shown in the drawings. Shown are:

BRIEF DESCRIPTION OF THE DRAWINGS

FIG. 4 is an exploded view of the protective switch of FIG. 3;

FIG. 6 is a sectional side view of the protective switch taken along the line VI—VI of FIG. 5, with the bimetallic strip in its resting position;

DETAILED DESCRIPTION OF THE PREFERRED EMBODIMENTS

The protective device according to the invention is integrated with a terminal box K for a pump motor M. The terminal box K is equipped with connection terminals L1–L3 and problem warning contacts a, b. The protective device has a power supply unit N, connected to the connection terminals L1, L2 of the terminal box, a control and evaluation electronic unit, or an evaluation or control unit A, a tripping thyristor T, and a bimetal-controlled protective switch 1.

The control and evaluation electronic unit A is connected to temperature sensors R1 inserted into the windings of the motor M. Moreover, the control and evaluation electronic unit A is connected to sensors H for detecting the current consumption of the motor M. The protective switch 1 has four contact bridges 35. If the contact bridges 35 are closed, the motor M is connected to the connection terminals L1–L3 of the terminal box K and, at the same time, the problem warning contacts a, b are interconnected as well. Moreover, if the protective switch 1 is closed, a control light LE lights up, indicating proper operation of the motor M.

Figure 2:
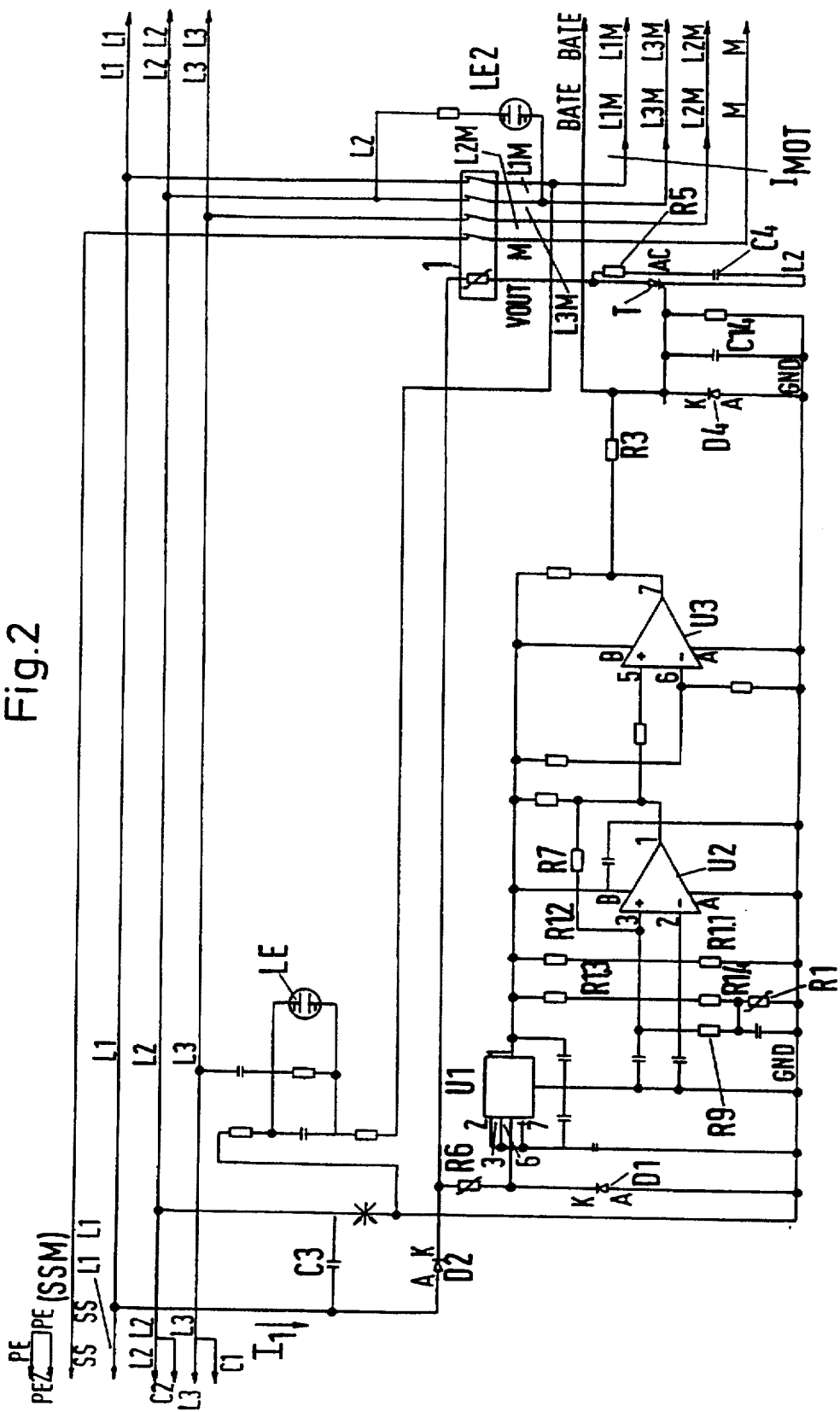
FIG. 2 is a circuit diagram of the protective device of FIG. 1.

The power supply unit N of the protective device is embodied essentially of the components C3, D2, R6, D1 and U1 shown in FIG. 2. The power supply is effected from the terminal voltage applied to the connection terminals L1, L2 via the components D2, R6 and D1. The diode D2 serves the purpose of single-phase rectification of the alternating voltage. By means of the temperature-dependent resistor R6 (PTC), a limitation of the input current I1 is attained over a wide input voltage range, which can amount to 230 to 400 V, for example. The Zener diode D1 serves to prestabilize the voltage controller U1. The voltage controller U1 stabilizes the supply voltage for the control and evaluation electronic unit A. The capacitor C3 serves as a protective wiring against voltage peaks from the general power supply grid.

The temperature sensors R1 inserted into the motor winding are embodied in the present case as PTC resistors. These PTC resistors R1 are disposed in the branch of a resistive bridge formed of the resistors R1.1–R1.4. A parallel resistor R9 connected parallel to the resistive bridge is dimensioned such that at a winding temperature that corresponds to the normal operating state of the motor M, or in other words that is below a response temperature, the resistive bridge is in the balanced state. The bridge voltage of the resistive bridge is connected to the differential inputs of an operational amplifier U2.

In the normal state of the PTC resistor R1, the output potential of the operational amplifier U2 is accordingly equal to zero. If the allowable winding temperature is exceeded, the PTC resistors become highly resistive, so that the differential voltage applied to the inputs of the operational amplifier U2 becomes positive and thus the output of the operational amplifier U2 rises to a level of approximately 5 V. By means of a resistor R7, a feedback is established that leads to a circuit hysteresis and hence a reliable switchover of the operational amplifier U2.

A second operational amplifier U3 is triggered by the first operational amplifier U2 and with its output voltage fires the thyristor T. Firing of the thyristor T heats a temperature-dependent resistor 19, integrated into the protective switch 1, whose function will be described further below. The resistor 19 is a PTC resistor. Because of its heating, after a predetermined response time the protective switch 1 trips, so that the contact bridges 35 of the protective switch 1 are opened, and the motor current is interrupted. The resistor R3 serves to limit the firing current of the thyristor T. The diode D4 and the capacitor C14 form a protective wiring of the thyristor gate. The capacitor C4 and the resistor R5 protect the thyristor T from voltages from the general power supply grid.

Because of the heating of the temperature-dependent resistor 19 contained in the protective switch 1, the protective switch 1 cannot be manually reset until the temperature of the bimetallic strip 18, heated by the resistor 19, has dropped. As a result, the motor M cannot be turned on again until the winding temperature of the motor M, detected by the PTC resistor R1, has dropped below the response temperature of the control and evaluation electronic unit A, so that the thyristor T is turned off and hence the bimetallic strip 18 of the protective switch 1 is no longer heated. As a result, a time predetermined by the cooling-down speed of the bimetallic strip 18 must elapse between the shutoff of the motor M and the resetting of the protective switch 1, and in this time it is not possible to restart the motor M. As a result of this temperature- and time-dependent restarting inhibition, overly early and overly frequent turning on of the motor M, and the attendant possible damage to the motor windings, is averted.

For turning on the motor M the protective switch 1 has, in addition to its three contact bridges 35, a fourth contact bridge 35 by way of which the problem warning contacts a, b are to be interconnected with one another. The control light LE is located between the connection terminals L1 and L3 of the terminal box K. When the protective switch 1 is closed, the control light LE signals malfunction-free operation of the motor M. A second, warning light LE2 is located above a second contact of the protective switch 1. With the protective switch 1 tripped, or in other words if there is a malfunction of the motor M, when the contact bridges 35 are opened, the voltage located above the contact causes the warning light LE2 to respond, which thus indicates a malfunction of the motor M.

The structure of the protective switch 1 will be described in further detail below.

Figure 3:
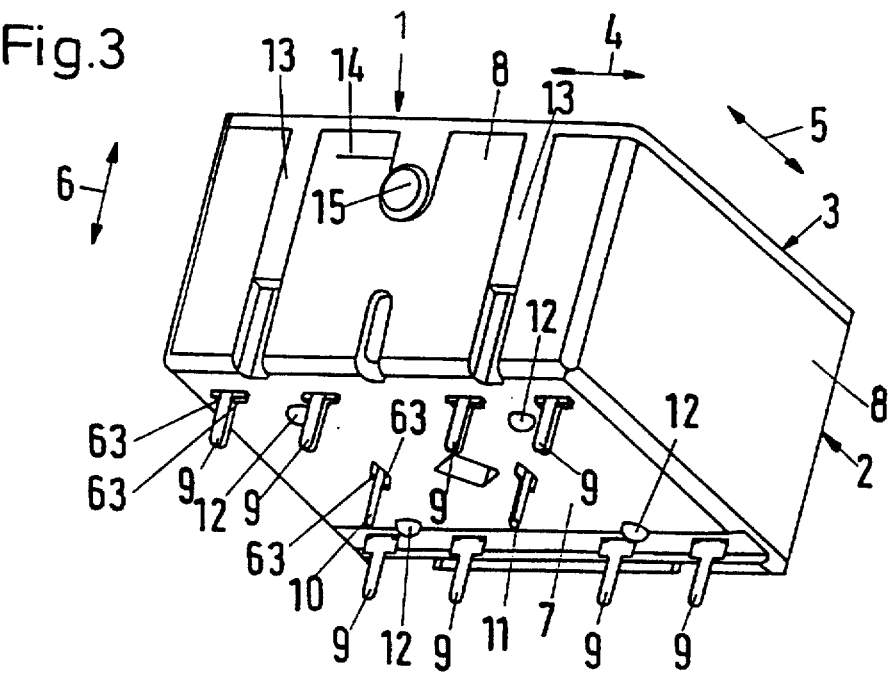
FIG. 3 is a perspective view of the protective switch in its final installed state.

In FIG. 3, the protective switch 1 can be seen, with essentially block-shaped outer contours. The block-shaped plastic switch housing is composed of a cup-shaped housing shaft 2 and a housing cap 3 mounted thereon. The outer contours of the protective switch 1 extend in the lengthwise direction 4, crosswise direction 5 and heightwise direction 6, which are at right angles to one another.

The housing shaft 2 is made up of a housing bottom 7 and side walls 8 formed integrally onto it at right angles to it. The housing bottom 7, viewed in the heightwise direction 6, has a rectangular outer contour and is located in the plane defined by the lengthwise direction 4 and crosswise direction 5. Of the four side walls 8, in FIG. 3, only two adjoining side walls can be seen, located in the planes defined by the heightwise direction 6 and lengthwise direction 4 on the one hand and the heightwise direction 6 and crosswise direction 5 on the other.

The housing shaft 2 in cupshaped fashion receives the components associated with a consumer circuit and a control circuit as well as the components of a tripping mechanism. Pinlike consumer connections 9 protrude in the heightwise direction 6 from the housing bottom 7. Two consumer connections 9 at a time, located one after the other in the crosswise direction 5, are associated with one phase of the consumer circuit. The consumer circuit may be single-phase or multi-phase. In FIG. 3, the protective switch 1 is embodied as a four-pole switch. Accordingly, the housing bottom 7 is pierced by a total of eight consumer connections 9. Four consumer connections 9 at a time are located in the peripheral regions, extending in the lengthwise direction 4, of the housing bottom 7.

Figure 1:
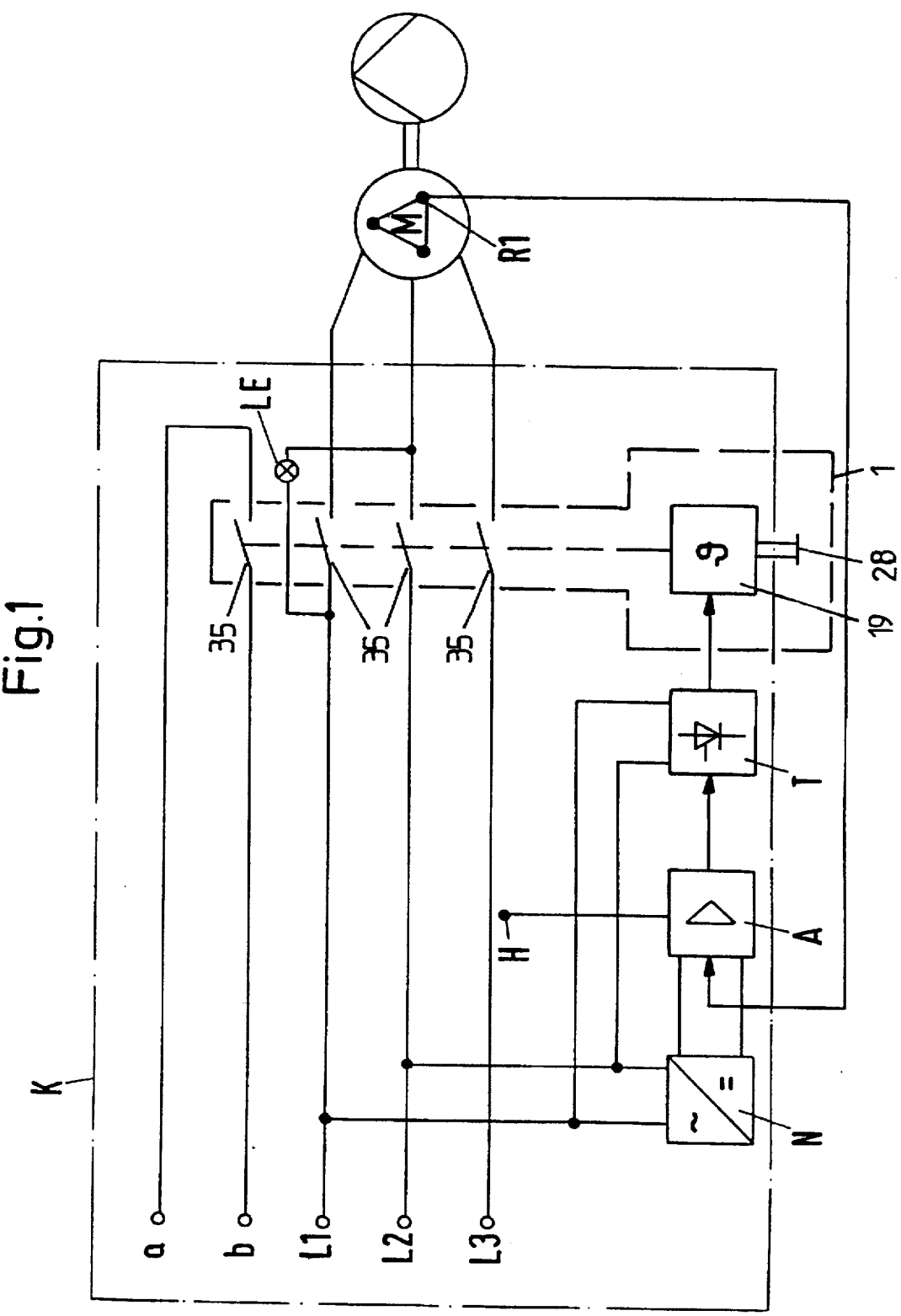
FIG. 1 is a schematic illustration of a protective device for a pump motor.

In its central region, the housing bottom 7 is pierced along the heightwise direction 6 by two likewise pinlike control connections 10, 11. For the sake of secure fastening, the consumer connections 9 and control connections 10, 11 can be made wider in the region of the housing bottom 7 because of the presence of connection notches 63, or can be rotated around their longitudinal axis extending in the heightwise direction 6. A control device is connected to the two control connections 10, 11. By means of the temperature sensor R1 or the sensor H (FIG. 1, FIG. 2), the control device measures a physical variable of an electrical consumer, such as the temperature of a motor winding, or an external physical variable. If a limit value of the measured physical variable is exceeded, a control voltage is applied to the two control connections 10, 11. In that case, a control current flows through the components, to be described later, of the control circuit.

The protective switch 1 is soldered to a printed circuit board with the aid of the consumer connections 9 and control connections 10, 11. For that purpose, four approximately hemispherical spacer bumps 12 are formed onto the housing bottom 7. The spacer bumps 12 are located in the region of the housing bottom 7 bounded by the consumer connections 9. When the protective switch 1 is mounted on the printed circuit board, they effect a spacing between the housing bottom 7 and the printed circuit board.

In FIG. 3, the housing shaft 2 is closed by the housing lid 3. To that end, the housing lid 3 is placed on the housing shaft 2 in the heightwise direction 6. Viewed in the heightwise direction 6, the outer contour of the housing cap 3 matches that of the housing shaft 2. A total of four spring hooks 13, only two of which are visible in FIG. 3, are integrally formed onto the housing cap 3, extending in the heightwise direction 6. The spring hooks 13 are rectangular, viewed in the crosswise direction 5, and in the heightwise direction, beginning at their longer side, they extend from the level of the housing cap toward the housing bottom 7. Two spring hooks 13 are formed onto each of the two side edges of the housing cap 3 that extend in the lengthwise direction 4. They lock into suitably embodied recesses, extending in the heightwise direction 6, in the side walls 8.

A button fixation rib 14, extending parallel to the two springs hooks 13 visible in FIG. 3 and serving to interlock the housing cap 3 to the housing shaft 2, is integrally formed onto the housing cap 3. As viewed in the lengthwise direction 4, the button fixation rib 14 is located in the middle between the two spring hooks 13 and is embodied as widened in this direction compared with the spring hooks 13. The button fixation rib 14 extends in the heightwise direction 6 only approximately half as far as the spring hooks 13. Its outer contour toward the housing bottom 7 is curved outward in the manner of a segment of a circle. The concave side of this curvature encompasses a pushbutton 15 with a positive fit. Viewed in the crosswise direction 5, the pushbutton 15 has a circular pressure face by which it is manually actuated. It protrudes as a cylindrical part from the side wall 8, which is located in the plane defined by the heightwise direction 6 and the lengthwise direction 4. To enable the side wall 8 to receive the pushbutton 15 and the button fixation rib 14 with a positive fit, it is provided with a U-shaped pushbutton receptacle 16 (FIG. 4).

It can be seen from FIG. 4 that a plurality of ribs with different outer contours are formed on the housing shaft 2 and on the housing cap 3. They serve to guide the motion and support of the components inserted into the housing shaft 2 in the final installed state, which components are visible in FIG. 4. With the components shown there, the current paths of the current circuit and consumer circuit are realized inside the protective switch 1 and its tripping mechanism. The current path of the control circuit inside the protective switch 1 is formed, beginning at the control connection 10 connected to a contact bracket 17, by the bimetallic strip 18, the temperature-dependent resistor 19, a compression spring 20, and a spring support 21 connected integrally to the control connection 11.

The contact bracket 17 is U-shaped when viewed in the crosswise direction 5. The legs of the U are formed by striplike spring tongues 22, 23 extending in the heightwise direction 6. The two spring tongues 22, 23 are shaped identically. In the region of their free ends, the two spring tongues 22, 23 are curved in the heightwise direction 6 in such a way there they each form one V-shaped notch 24 with openings facing one another in the lengthwise direction 4. The bottom of the U of the contact bracket 17 is formed by a bracket frame 25 of hexagonal shape viewed in the heightwise direction 6. It is located in the plane defined by the lengthwise direction 4 and crosswise direction 5. It joins the two spring tongues 22, 23 to one another. The connecting point between the bracket frame 25 and the spring tongues 22, 23 is located on each end that is remote, in the heightwise direction 6, from the respective notch 24. In this region, the control connection 10 is also integrally formed onto the spring tongue 22.

The two spring tongues 22, 23 are prestressed, facing one another in the lengthwise direction 4. The disklike bimetallic strip 18 can in this way be reliably supported in the notches 24. The spring pressure generated in the lengthwise direction 4 by the spring tongues 22, 23 also brings about the electrical contacting between the control connection 10 and the bimetallic strip 18. Viewed in the heightwise direction 6, the bimetallic strip 18 has two outer edges extending in the lengthwise direction 4 and two side edges 26, 26' that join the outer edges along the crosswise direction 5. The side edges 26, 26' have a curved course in the manner of a circular segment in the crosswise direction 5. They face one another with their concave sides. In the final installed state, the side edges 26, 26' make virtually pointwise contact with the bottom of the V of the V-shaped notch 24 oriented toward them. This pointwise support means that the spring tongues 22, 23 are practically unstrained mechanically in the heightwise direction 6 by the deflection motions of the bimetallic strip 18. In this way, the spring pressure of the spring tongues 22, 23 is also preserved over a very long operating time.

In the final installed state, the bimetallic strip 18 is electrically contacted with the circular surface of the temperature-dependent resistor 19. The resistor 19 is preferably embodied as a PTC resistor. Besides giving up heat as desired to heat the bimetallic strip 18, the PTC resistor also limits the control current and hence also takes on a protective function for the control circuit. If this protective function is unnecessary, however, then it is also conceivable to use an NTC resistor as the resistor 19. In FIG. 4, the resistor 19 has a disk shape. At its circular surface remote from the bimetallic strip 18, the resistor 19, in the final installed state, contacts the compression spring 20 embodied as a helical spring. The direction of action of the compressive force of the compression spring 20 corresponds to the heightwise direction 6. The end of the compression spring 20 remote from the resistor 19 also contacts the spring support 21, in the final installed state. The spring support 21 extends in a plane defined by the lengthwise direction 4 and the crosswise direction 5. It is embodied as an approximately square plate and is bent at a right angle relative to the control connection 11 integrally connected to it. Here, the control connection 11 is embodied as an extension of a corner edge of the metal spring support 21.

A slide 27 of U shape when viewed in the crosswise direction 5, a lock body 28 that includes the pushbutton 15, and a lock spring 29, embodied as a leaf spring of U shape viewed in the lengthwise direction 4, form the essential components for interrupting the consumer circuit. The bottom of the U of the slide 27 is embodied as wider in its central region toward the bimetallic strip 18, in the form of a slide protrusion 30. Viewed in the crosswise direction 5, the outer contours of the slide protrusion 30 extend parallel to the heightwise direction 6, in the region adjoining the bottom of the U. This region is adjoined by an angled course of the slide protrusion 30, with an apex or tip of the angle pointing toward the bimetallic strip 18. The region of the tip of the cone of the slide protrusion 30 forms the contact face for the bimetallic strip 18, the bimetallic strip being deflectable in the heightwise direction 6. Because of the special support of the bimetallic strip 18, its middle region is deflected most appreciably. The middle region of the bimetallic strip is therefore also curved the most extensively in the activation and resting positions. For this region, the approximately pointwise force engagement of the tip of the angle of the slide protrusion 30 viewed in the crosswise direction 5 is highly effectively suited, in the middle region of the bimetallic strip 18 (FIG. 6, FIG. 7), for a major transmission of force of the deflection motions of the bimetallic strip 18 to the slide 27.

The central region of the slide protrusion 30 is pierced in the crosswise direction 5 by a circular slide recess 31. In the final installed state of the protective switch 1, a cylindrical lock pin 32 associated with the lock body 28 can engage this slide recess 31. On the surface of the bottom of the U of the U-shaped slide 27, remote from the bimetallic strip 18 in the heightwise direction 6, a total of four slide bumps 33 are formed in the lengthwise direction. The two outermost slide bumps 33 are located in the region of the legs of the U of the U-shaped slide 27. Each individual slide bump is rounded slightly in the lengthwise direction 4. The stop bump 34 is located between the two inner slide bumps 33. The stop bump 34 is likewise embodied as slightly rounded in the lengthwise direction 4. In the heightwise direction 6, stop bump 34 is extended to a shorter distance than the slide bumps 33. Opposite the tip of the angle of the slide protrusion 30, stop bump 34 is formed onto the bottom of the U-shaped slide 27.

Figure 8:
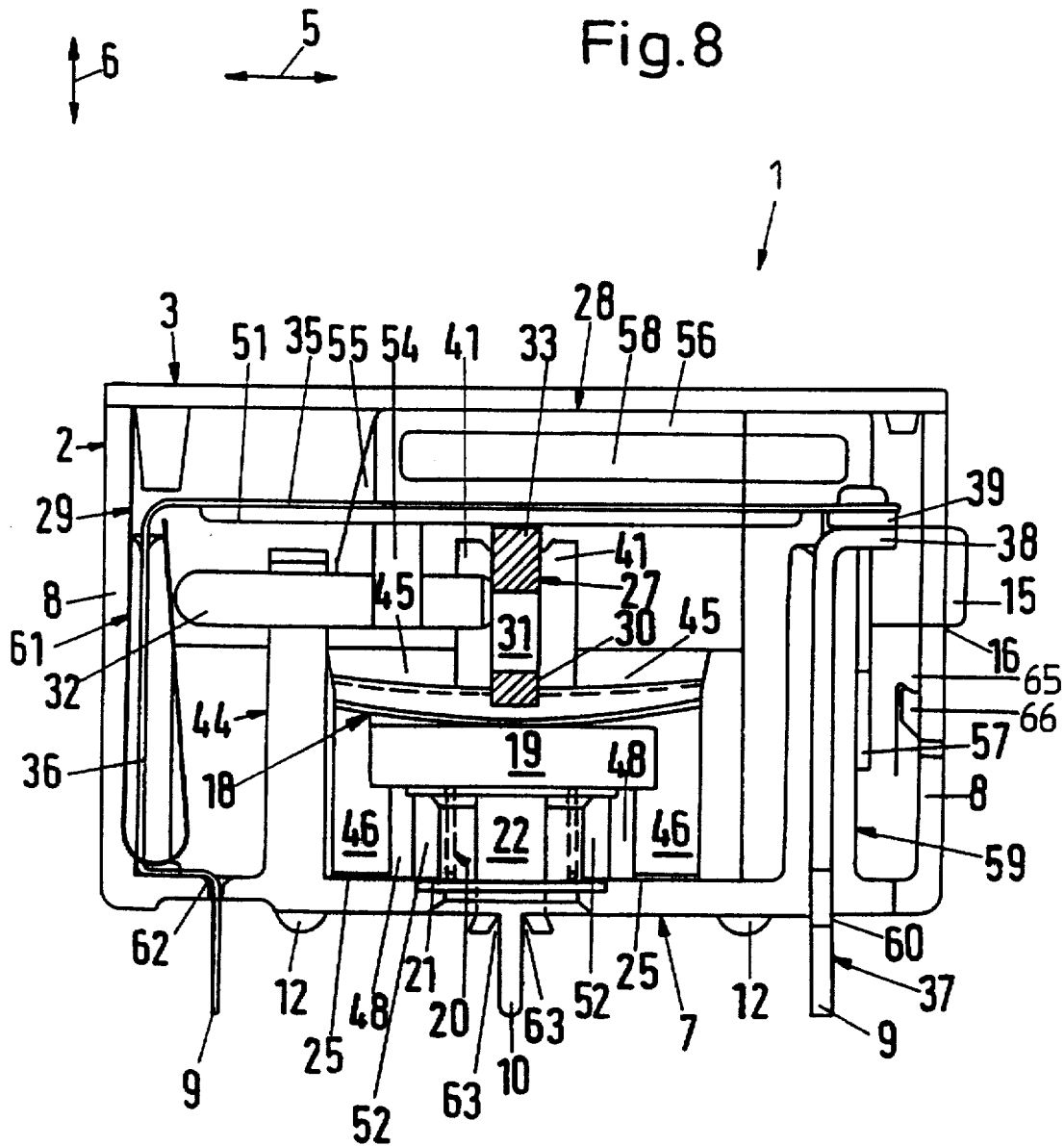
FIG. 8 is a sectional side view of the protective switch taken along the line VIII—VIII in FIG. 5, with the bimetallic strip in its resting position and with the contact bridges closed.

The stop bump 34 serves during the operation of the protective switch 1 as a detent stop for the lock pin 32, so that during the resting position of the bimetallic strip 18, the lock body 28 will remain securely in its unlocking position (FIG. 8).

During the displacement of the slide 27, the slide bumps 33 act upon the contact bridges 35, which are integrally joined to the consumer connections 9, in the heightwise direction 6 in order to interrupt the consumer circuits.

A short circuit must not be allowed to occur between the consumer and control circuits. A human operator must be protected against parts that carry voltage when he touches the pushbutton 15. At the same time, the slide 27 and the lock body 28 must be mechanically stable. For these reasons, these two components are preferably made of a stable plastic.

The contact bridge 35 is embodied as a contact spring and extends in the crosswise direction 5 with an essentially striplike, rectangular outer contour. It is integrally joined to a bridge extension 36 extending in striplike fashion in the heightwise direction 6. The contact bridge 35 and the bridge extension 36 are bent at right angles with respect to one another. In the lengthwise direction, they have approximately the same length. The bridge extension 36, on its end remote from the contact bridge 35, is bent at right angles toward the contact bridge 35. This bent region of the bridge extension 36 is adjoined by the consumer connection 9, which in turn is bent at right angles to the bridge extension. The second consumer connection 9 associated with the first consumer connection 9 forms the end of a striplike contact pin 37 extending in the heightwise direction 6. In its end region toward the consumer connection 9, the contact pin 37 is tapered in stepped fashion. In its end region remote from the consumer connection 9, the contact pin 37 is lengthened by a fixed contact 38. The fixed contact 38 is bent at right angles relative to the remainder of the contact pin 37 and is located in the plane defined by the lengthwise direction 4 and the crosswise direction 5. The surface of the fixed contact 38 toward the contact bridge 35 forms the electrical contact face for a rivet-like motion contact 39. The motion contact 39 is electrically conductively joined to the contact bridge 35, in that it is inserted into a circular opening located on the free end of the contact bridge 35 and is riveted or welded thereon. In order for the consumer circuit protective switch 1 to be closed, the contact bridge 35, with its spring force operative in the heightwise direction, presses the circular contact face of the motion contact 39 against the fixed contact 38.

Figure 5:
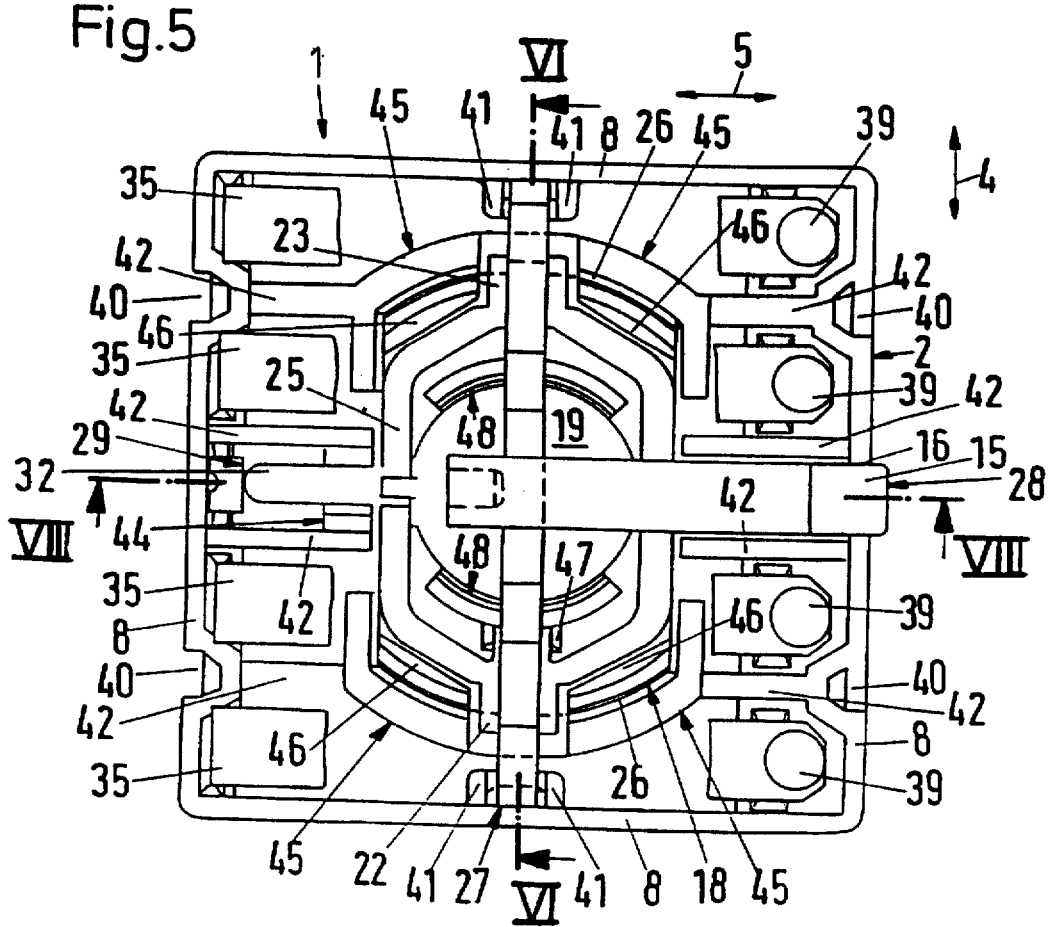
FIG. 5 is a plan view of the opened protective switch.

The components of the protective switch 1 shown in FIG. 4 are located in FIG. 5 inside the housing shaft 2, in their final installed state. It can be seen in FIG. 5 that the protective switch 1 is embodied essentially symmetrically with respect to an axis of symmetry corresponding to the section line VIII—VIII. This makes the protective switch 1 easier to manufacture and shortens the installation time for the various components. This symmetry is also a prerequisite for the compact, narrow design of the protective switch 1.

On each of the two side walls 8 extending in the lengthwise direction, two hook recesses 40 can be seen, into which the spring hooks 13 (FIG. 4) can snap into place. A fixation protrusion 65 is formed onto the housing shaft 2 (FIG. 4, FIG. 8) integrally in the region of each hook recess 40. When the housing cap 3 is slipped onto the housing shaft 2, the spring hooks 13 slide with hook protrusions 66 (FIG. 8) formed integrally onto their free ends along the fixation protrusions 65 and engage those protrusions from behind. The housing cap 3 and housing chute 3 are interlocked with one another thereby, so that unintended lifting of the housing cap 2 is prevented.

Four contact bridges 35 are disposed parallel to one another extending in the crosswise direction 5. Two contact bridges 35 each are located on either side of the lock body 28, which likewise is disposed extending in the crosswise direction 5. The special disposition of lock body 28 divides the housing shaft 2 in two halves along the lengthwise direction 4. The lock body 28 has an approximately cartridgelike, i.e., bulletlike outer contour. The lock pin 32 then forms the tip of the bullet. The semicircularly rounded end of the lock pin 32 remote from the pushbutton 15 strikes against the leg of the lock spring 29 adjacent thereto. The pushbutton 15 protrudes somewhat by its outermost region, in terms of the crosswise direction 5, with respect to the pushbutton receptacle 16. This indicates the turned-on state of the protective switch 1. The end of the lock pin 32 toward the pushbutton 15 is shown in dashed lines and strikes the slide 27 extending in the lengthwise direction 4. The end region of the lock pin 32 that strikes the slide 27 is embodied as tapering frustoconically in the direction toward the slide 27.

The slide 27 is disposed such that it divides the housing shaft 2 into two halves in the crosswise direction 5. With its side faces, it touches both side walls 8 extending in the crosswise direction 5. In terms of the section line VI—VI extending parallel to the lengthwise direction 4 and in terms of the section line VIII—VIII extending parallel to the crosswise direction 5, the slide 27 is embodied essentially symmetrically. In the region of the slide 27, two slide ribs 41 are formed onto each of the side walls 8 extending in the crosswise direction 5. Two slide ribs 41 each extend along the lengthwise direction 4 into the interior of the housing shaft 2 in such a way that between them they enclose the end region of the slide 27 that adjoins the side wall 8. They serve to guide the motion of the slide 27 during its displacement motions in the heightwise direction 6.

Four separating ribs 42 are provided on each of the two side walls 8 extending in the lengthwise direction 4. They have a rectangular outer contour and extend with their long side in the crosswise direction 5. They act as partitions and shield the various consumer circuits inside the protective switch 1 from one another. To that end, the separating ribs 42 toward the motion contacts 39 have the same structural height as the housing shaft 2 (FIG. 4). The separating ribs 42 formed onto the opposite side wall 8 are embodied as lower by comparison. In order to attain good shielding of the consumer circuits in this region as well, separating ribs 43 (FIG. 6) formed onto the housing cap 3 in the final installed state of the protective switch 1 adjoin the separating ribs 42. One separating rib 43 each and the associated separating rib 42 have the same thickness of material in the lengthwise direction 4. Together, they make up one complete partition in the heightwise direction 6.

These separating ribs 42 which on both sides touch the lock pin 32 are joined together in their end region opposite the side wall 8 by a support pin 44. This pin has a rectangular outer contour (FIG. 5) and extends from the housing bottom 7 in the heightwise direction 6 into the interior of the housing shaft 2. It has a greater structural height than the separating ribs 42 (FIG. 4) joined to it. In its end region toward the housing cap 3, it is provided with a U-shaped cut out, so that it can displaceably support the lock pins 32 in the crosswise direction 5.

In the middle region of the housing shaft 2, a plurality of bearing and fixation ribs are formed onto the inside of the housing bottom 7. They extend with various structural heights into the interior of the housing shaft 2. They serve to fix the bimetallic strip 18, the contact bracket 17, the resistor 19 and the compression spring 20 in their final installed state and to guide the displacement and deflection motions of these elements. The surfaces of the guide and bearing ribs oriented toward the housing cap 3 are embodied as beveled toward the particular component that is to be fixed. The bearing space for the particular component is thereby widened in funnel-like fashion toward the housing cap 3, which facilitates installation of the components.

The bimetallic strip 18 is encompassed with a positive fit by a fixation rib 45. The curved side edges 26 of the bimetallic strip 18 are oriented toward the side walls 8 extending in the crosswise direction 5. The regions of the fixation rib 45 that extend in correspondingly curved fashion are interrupted in the region of the slide 27. The two spring tongues 22, 23 are located in these interrupted regions of the fixation rib 45. The separating ribs 42 present in the region of the hook recesses 40 integrally adjoin the transitions between the curved portions and the portions extending in the lengthwise direction 4 of the fixation rib 45.

The portions of the fixation guide rib 45 extending in the lengthwise direction 4 are likewise interrupted in the region of the inner separating ribs 42 that intersect them. One fixation continuation 46 is formed onto each of the curved portions of the fixation rib 45. The fixation continuations 46 extend in the direction toward the resistor 19 located centrally in the housing shaft 2 and thereby reduce the interior space defined by the entire fixation rib 45. The fixation continuations 46 touch the sides immediately adjacent the spring tongues 22, 23 of the hexagonal frame 25 in the region of the outer edges. In addition to this fixation, the contact bracket 17 is fixed in the housing shaft 2 by means of the control connection 10 that extends through an approximately rectangular connection slot 47 of the housing bottom 7.

The bimetallic strip 18 covers the bracket frame 25 in the lengthwise direction 4. In the crosswise direction 5, conversely, the bimetallic strip 18 and bracket frame 25 have the same lengths in the region of the sides thereof remote from the spring tongues.

The resistor 19 is sheathed with a positive fit by two annular-segmental fixation ribs 48. The two fixation ribs 48 are disposed facing one another in the lengthwise direction 4 with their concave sides toward one another. They essentially fix only the regions of the resistor 19 oriented toward the side walls 8 extending in the crosswise direction 5.

It can be seen in FIG. 6 that the contact bridges 35 are located in individual chambers 49 partitioned off by the separating ribs 43. Between the two chambers 49 oriented toward the lock body 28, the lock body 28 is located in a separate chamber 50.

Viewed in the crosswise direction 5, the contact bridges 35 are provided on their surfaces toward the slide bumps 33 with approximately semicircular bridge reinforcements 51. The convex side of the bridge reinforcement 51 is oriented toward the associated slide bump 33. The bridge reinforcement 51 extends in the crosswise direction 5 over the predominant portion of the contact bridge 35 (FIG. 8) and is preferably produced integrally with the contact bridge in the form of a bulging outward of the surface thereof. The bridge reinforcements 51 are acted upon by the slide bumps 33, when the slide 27 is displaced in the direction of the housing cap 3, in order to interrupt the consumer circuits.

In FIG. 6, the consumer circuits are closed. The free ends of the legs of the U of the slide 27 rest on the inside of the housing bottom 7. There is accordingly a small air gap between the bridge reinforcements 51 and the slide bumps 33.

In FIG. 6, the current path of the control circuit within the protective switch 1 can be seen. The two spring tongues 22, 23 are prestressed in the direction of the resistor 19. The effect of this spring pressure is that the bimetallic strip 18 supported in the notches 24 is curved. In the process, the bimetallic strip 18, with the central region of its convex side, contacts the resistor 19. In this resting position of the bimetallic strip 18, there is an air gap between it and the tip of the angle of the slide protrusion 30. The surfaces of the resistor 19 oriented toward the bimetallic strip 18 and the compression spring 20 are embodied as electrically conductive. Because of its spring force effective in the heightwise direction 6, the compression spring 20 is supported by its two ends on the resistor 19 and on the electrically conductive spring support 21, respectively. At least along a portion of its outer periphery, the compression spring 20 is surrounded with a positive fit by a fixation rib 52 formed onto the inside of the housing bottom 7. Because of the spring force of the compression spring 20, a permanently good electrical contact pressure with the resistor 19 and the spring support 21 results. A control current fed to the control connection 10, for instance, flows via the spring tongue 22 or the bracket frame 25 and the spring tongue 23 into the bimetallic strip 18. From the bimetallic strip 18, the control current flows via the resistor 19, the compression spring 20 and the spring support 21, into the control connection 11. The spring support 21 is fixed in stationary fashion by a connection slit 64 on the housing bottom 7 through which the control connection 11 extends. It can be seen from FIG. 6 and FIG. 7 that the protective switch 1 is embodied essentially symmetrically with respect to an axis of symmetry 53 that extends parallel to the heightwise direction 6 and is penetrated by the tip of the angle of the slide protrusion 30.

Figure 7:
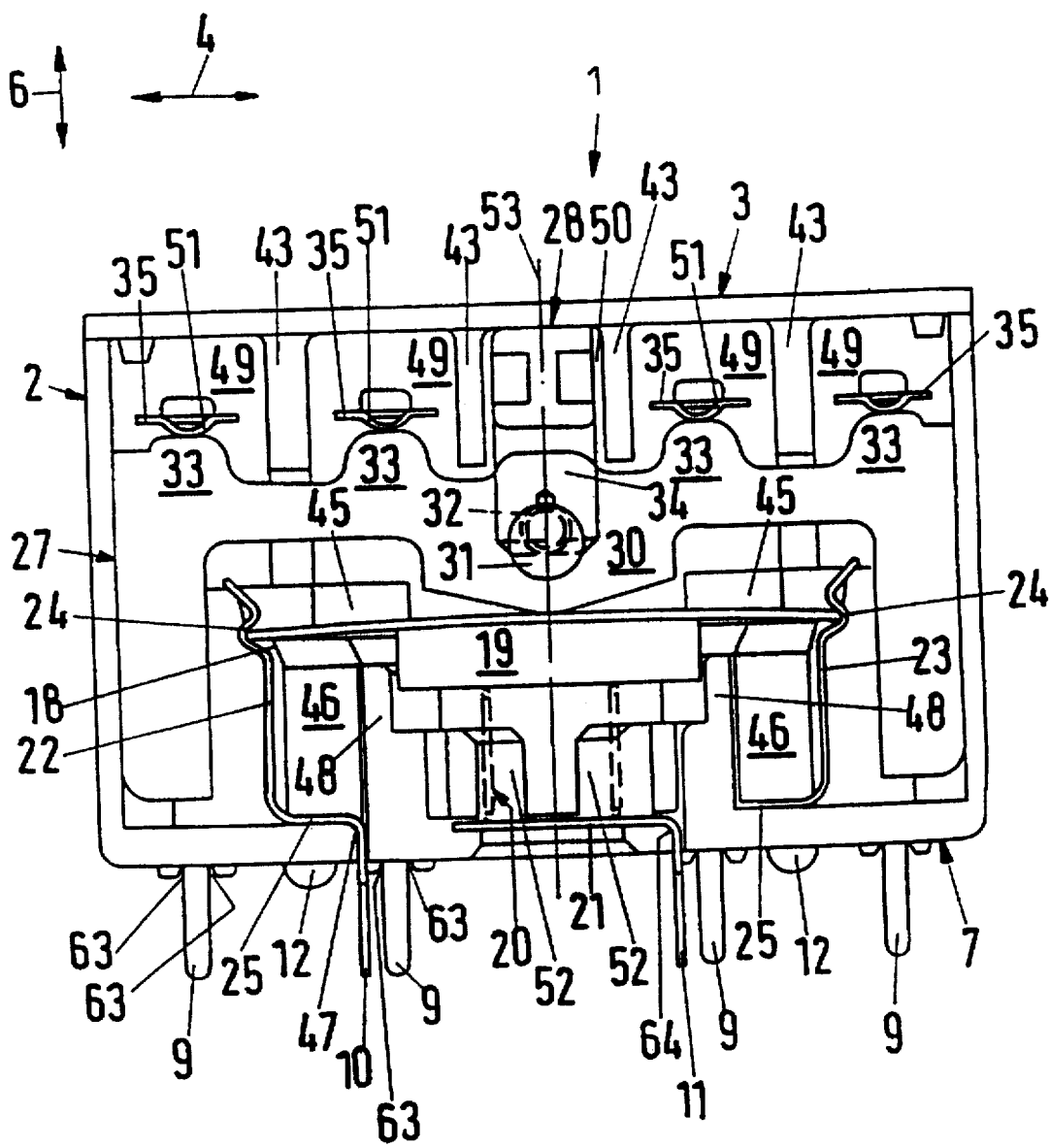
FIG. 7 is the side view of the protective switch of FIG. 6 with the bimetallic strip in its activation position.

In FIG. 7, the bimetallic strip 18 is in its activation position. Because of the spring pressure of the spring tongues 22, 23, which is operative in the lengthwise direction 4, the bimetallic strip 18 acts as a snap disk and is deflected in its middle region in the direction of the slide protrusion 30. The deflection motion is further reinforced by the spring pressure of the compression spring 20. The bimetallic strip 18 acts upon the tip of the angle of the slide protrusion 30 and thereby moves the slide 27 in the direction of the housing cap 3. The free ends of the legs of the U of the slide 27 no longer rest on the inside of the housing bottom 7. The slide 27 in turn, with its slide bumps 33, acts upon the bridge reinforcements 51 in the contact opening direction of the contact bridges 35. The contact bridges 35 are therefore in their contact opening position in FIG. 7. In this position, the electrical contact between the fixed contacts 38 and the associated motion contacts 39 is interrupted, so that the consumer circuit is interrupted as well.

In FIG. 7, the slide 27 is in its locking position. It is locked by the lock pin 32 that engages the slide recess 31.

Figure 9:
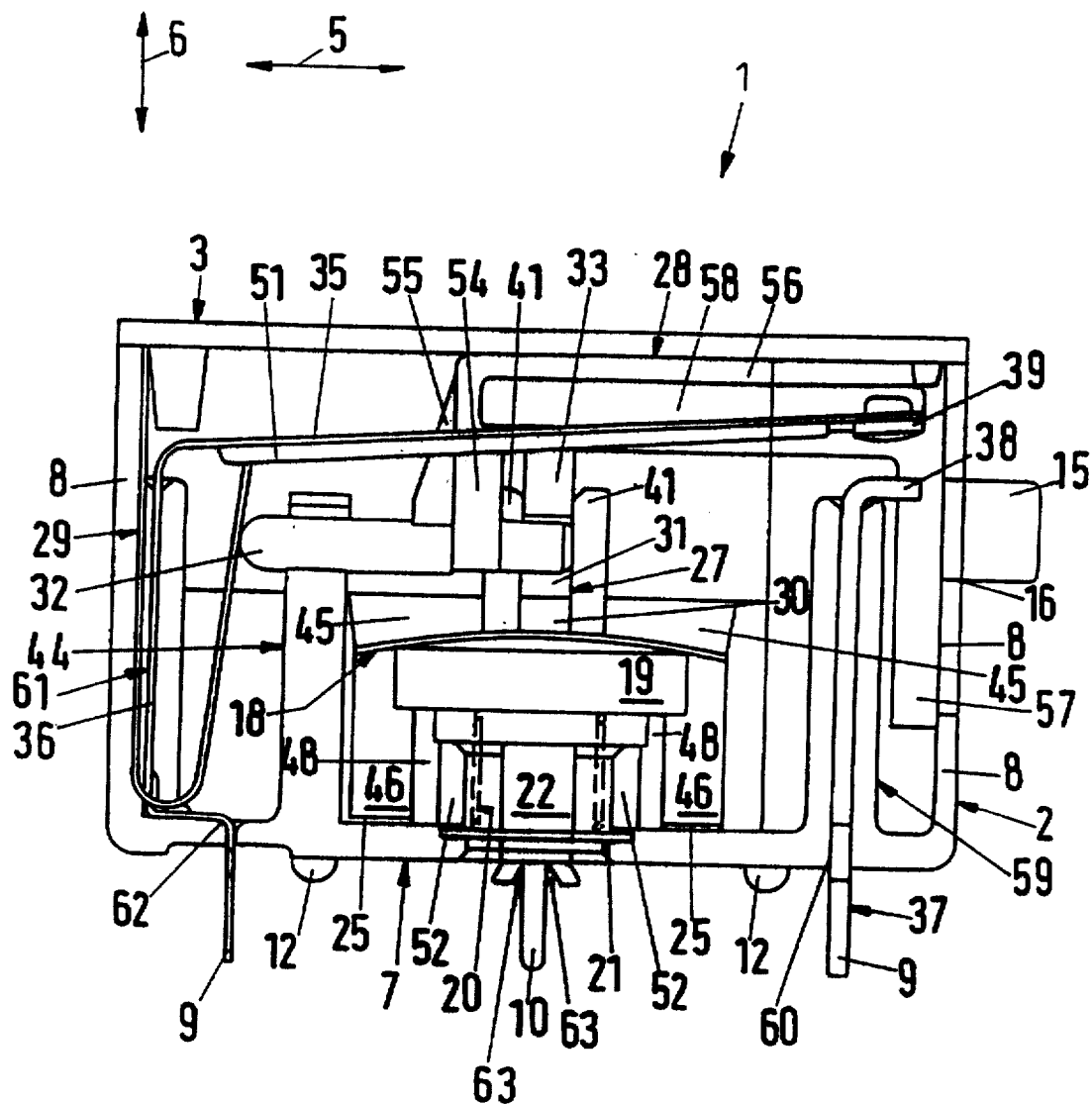
FIG. 9 is the side view of the protective switch of FIG. 8, with the bimetallic strip in its activation position and with the contact bridges opened.

In FIG. 8 and FIG. 9, the action of the locking device can be seen.

Because of the lock pin 32 extending through the support pin 44, and because of the pushbutton 15 extending through the pushbutton receptacle 16, the lock body 28 is supported displaceably in the housing shaft 2. Because of this special support, the lock body 28 can execute displacement motions only in the crosswise direction 5. The U-shaped lock spring 29 acts upon the end of the lock pin 32 adjacent thereto with the free end of the shorter one of its legs in the direction of the slide recess 31. Since the slide 27 is in its unlocking position, the lock pin 32 is clamped on the one hand between the leg shorter of the U shaped lock spring 29, which is prestressed in the direction of the slide recess 31, and on the other hand the slide 27. The longer of the two legs of the U shaped of the lock spring 29 is fixed on the inside side wall 8 and extends from the region of the housing bottom 7 as far as the structural height of the housing shaft 2. The longer leg of the U shaped lock spring 29 extends precisely in the heightwise direction 6, while the shorter leg of the U shaped lock spring 29 extends in inclined fashion relative to the heightwise direction 6, toward the longer leg of the U.

Between the support pin 44 and the slide 27, a cantilever or pin holder 54 protruding at right angles from the lock pin and extending in the direction of the housing cap 3 is formed thereon.

A limiting protrusion 55 is formed onto the pin holder 54, on the side remote from the support pin 44. Beginning at the end region of the pin holder 54 extending to the inside of the housing cap 3, this limiting protrusion extends toward the support pin 44, inclined obliquely relative to the heightwise direction 6. There is a small gap between the limiting protrusion 55 and the support pin 44. The limiting protrusion 55 can be used to prevent an unintended excessive displacement of the lock body 28 toward the lock spring 29, because the limiting protrusion 55 will strike the support pin 44. This protects the lock spring 29 against excessive bending strains. The pin holder 54 is joined to the pushbutton 15 by a connecting rail 56, which extends parallel to the housing cap 3 and touches the cap with its surface adjacent the housing cap 3, and by a rail extension 57 formed onto the connecting rail 56. Connecting rail 56 and rail extension 57 together constitute a pressure tappet. The connecting rail 56 has a substantially rectangular outer contour. On a somewhat reduced scale from this outer contour, the connecting rail 56 is provided with an approximately rectangular rail recess 58. Since the lock body 28 is symmetrical with respect to the axis of symmetry 53 (FIG. 6, FIG. 7), it includes two of these rail recesses 58, one after the other in the lengthwise direction 4. The pin holder 54 and the rail extension 57 extend parallel to one another. The rail extension 57 is extended further than the cantilever 54 in the direction of the housing body 7. Viewed in the crosswise direction 5, the pin holder 54 and the rail extension 57 limit the length of the connecting rail 56. The pin holder 54 and rail extension 57 have approximately the same material thickness in the crosswise direction 5. The pushbutton 15 is disposed approximately in the middle region of the length of the rail extension 57 in the heightwise direction 6. The pushbutton 15, rail extension 57, connecting rail 56, pin holder 54 and limiting protrusion 55 are preferably made in one piece. The lock pin 32 can likewise be an integral component of the lock body 28. However, it is also conceivable to make the lock pin 32 as a separate component.

The current path of the consumer circuit within the protective switch 1 is closed in FIG. 8. The contact bridge 35 is in its contact closing position. The motion contact 39 and the fixed contact 38 electrically contact one another. The contact pin 37 is surrounded for a positive fit by a fixation rail 59 attached to the housing and extending in the heightwise direction 6. Fixation rail 59 is located in a peripheral region of housing shaft 2 toward the pushbutton 15 of the housing shaft 2 and is formed onto the inside of the housing bottom 7. The fixation rail 59 effects both a mechanical protection against damage and a contact protection for preventing an unintentional electrical contact between contact pin 37 and other components. In its end region adjacent the fixed contact 38, the fixation rail 59 is widened in funnellike fashion in order to make it easier to install the contact pin 37. The fixation rail 59 is lengthened in the heightwise direction 6 by a connection slot 60 which interrupts the housing bottom 7. The consumer connection 9 extends through connection slot 60.

Similarly, the bridge extension 36 is fixed in stationary fashion, in the final installed state, in a fixation rail 61 formed onto the side wall 8 toward the lock pin 32. This fixation is further reinforced by a connection slot 62, through which the consumer connection 9 integrally joined to the contact bridge 35 extends.

The bimetallic strip 18 is located in its resting position FIG. 8. In FIG. 8 as in FIG. 6, the bimetallic strip 18 has its convex side adjacent resistor 19. The bimetallic strip 18 can therefore be compared to the jacket segment of a ball, which with its middle surface region acts in its resting position (FIG. 6, FIG. 8) upon the resistor 19 and in its activation position (FIG. 7, FIG. 9) upon the slide protrusion 30.

In FIG. 9, the bimetallic strip 18 is in its activation position. The deflection motion of the bimetallic strip 18 is reinforced by the compression spring 20, which stretches out in the heightwise direction 6 because of its spring pressure. This displaces the slide 27 in the contact opening direction of the contact bridge 35, so that the current path within the consumer circuit is interrupted. At the same time, the slide recess 31 is displaced in the heightwise direction 6 in such a way that the lock body 28, because of the spring pressure of the lock spring 29, is displaced in the direction of the side wall 8 toward the pushbutton 15. This displacement motion of the lock body 28 is limited by the rail extension 57 striking the side wall 8. Substantially a majority of the volume of pushbutton 15 protrudes from the housing shaft 2 and thereby signals the off state of the protective switch 1. The switch positions of the pushbutton 15 can be visualized even better if the jacket faces of the pushbutton 15 are provided with a particular signal color.

The aforementioned displacement motion of the lock body 28 is enabled by the lock pin 32, which, with its end region remote from the lock spring 29, engages the slide recess 31. The lock spring 29 acting as a leaf spring is at least partially relaxed in the locking position of the slide 27.

The mode of operation of the protective switch 1 will now be described in conjunction with FIGS. 6–9. In FIG. 6 and FIG. 8, the protective switch 1 is in its on state. For a human operator, this is indicated visually by the fact that the pushbutton 15 protrudes only minimally in terms of its volume from the housing shaft 2. In the on state of the protective switch 1, the contact bridge 35 is electrically conductively connected to the contact pin 37 (FIG. 8). The slide 27 is in its unlocking position (FIG. 6). A control device not shown here is connected to the control connections 10, 11 and generates a control current, if the limit value of a measured physical variable is exceeded. The control current heats the bimetallic strip 18 and the resistor 19. The resistor 19 can give up its heat energy to the bimetallic strip 18, so that the bimetallic strip 18 can attain its activation position (FIG. 7, FIG. 9) in a shorter time. Because of the special support of the bimetallic strip 18, essentially only its middle surface region is deflected in the direction of the slide 27. Consequently, the bimetallic strip 18 functions like a snap disk, and can as a result transmit its deflection motion especially effectively to the slide protrusion 30. In this deflection motion, retention characteristics of the bimetallic strip 18 change thus causing the bimetallic strip 18 to no longer be capable of sustaining the retention force necessary for compressing the compression spring 20 (FIG. 6). The spring can thus stretch in the heightwise direction 6 (FIG. 7) and effect a spring force on the bimetallic strip which reinforces the deflection motion thereof. These provisions shorten the response time of the protective switch 1 to a great extent. Moreover, by simple means, a major force is generated to influence the tripping mechanism.

By its prestressing in the contact closing direction (FIG. 8), the contact bridge 35 generates a permanently good contact pressure between the fixed contact 38 and the motion contact 39. Because of the deflected bimetallic strip 18 as shown in FIG. 7, the slide 27 acts upon the contact bridge in the contact opening direction, counter to its prestressing. In FIG. 7, the contact bridge 35 is therefore in its contact opening position. The lock pin 32 engages the slide recess 31 in order to lock the slide 27. The lock body 28 is displaced in the direction of the contact pin 37 in such a way that the pushbutton 15 protrudes to the maximum extent from the housing shaft 2 and therefore signals the off state of the protective switch 1 to the human operator.

In its activation position (FIG. 7, FIG. 9), the bimetallic strip 18 remains in contact with the electrically conductive surface toward it of the resistor 19. As a result of the spring pressure of the compression spring 20, a good electrical contact pressure is therefore preserved in the activation position of the bimetallic strip 18 between the bimetallic strip 18, the resistor 19, the compression spring 20 and the spring support 21. In this way, the control circuit within the housing shaft 2 is always reliably closed. Thus, as long as the control current is present, the bimetallic strip 18 continues to remain in its activation position (FIG. 7, FIG. 9) and with reinforcement by the compression spring 20 continues to act upon the slide 27 in the direction of the housing cap 3. The consumer circuit therefore remains interrupted even if an attempt is made, by manual actuation of the pushbutton 15, to establish the on state of the protective switch 1. This is an effective protection for the electrical consumer, since in this way, if the limit value of the measured physical variable is exceeded, the consumer circuit can never be closed.

If the control current is no longer present, then after cooling down to a certain extent, the bimetallic strip 18 snaps over in the direction its resting position (FIG. 6, FIG. 8). In the process of cooling down and snapping over, the bimetallic strip 18 exerts a force oriented toward the housing bottom 7. This force, beyond a certain amount, overcomes the spring force counter to it generated by the compression spring 20. In this way, the resistor 19 and the compression spring 20 are forced back into their starting position (FIG. 6, FIG. 8). In that case, the slide 27 is retained in its locking position only by the end region of the lock pin 32 engaged therein. By actuation of the pushbutton 15, the lock pin 32 is pushed out of the slide recess 31, thus overcoming the spring force generated by the lock spring 29. The slide 27 is displaced toward the housing bottom 7 by the force of gravity and the contact bridge 35 prestressed on the contact closing direction. No further force counteracts the spring force of the contact bridge 35, so that the current path of the consumer circuit is closed again inside the housing shaft 2 (FIG. 8).

In another version of the protective switch 1, it is provided that no lock body 28 be used. In that case, the result is a cyclical mode of operation of the protective switch 1. The switching state of the protective switch 1 is then dependent solely on the position of the bimetallic strip 18. With the aid of the lock body 28, the attainment of the on state of the protective switch 1 is dependent additionally on the unlocking of the slide 27. As soon as the bimetallic strip 18 is back in its resting position, a human operator, via the pushbutton 15, can influence only the precise point when the protective switch 1 turns on again.

The directions of all the forces generated by the springs and of the displacement and deflection motions of the components inside the housing shaft 2 are either parallel to or at right angles to one another. This is an important prerequisite for the compact, narrow structure of the protective switch 1. Moreover, with components having structurally simple designs, highly effective transmissions of force become possible. Because of the simple technology, the protective switch 1 can on the one hand be produced at less cost. On the other hand, the simple technology assures a highly reliable mode of operation of the protective switch 1. The spring tongues 22, 23, the bimetallic strip 18, the resistor 19 and the compression spring 20 have mechanical bearing functions and at the same time have electrical conduction functions. This combination brings about a considerable reduction in components required inside the protective switch 1. Because of the spring pressures of the spring tongues 22, 23 and of the compression springs 20, the bimetallic strip 18 and the resistor 19 are stably supported in a very simple way. The stable support in turn brings about a permanently good electrical contact pressure between the components that form the current path of the control circuit.

The possibilities of linking together the mechanical support and a simultaneously effective electrical contacting among various components is exploited highly effectively in this invention in a technically simple way.

We claim:

1. In a protective device for an electrical consumer disposed in a consumer circuit, the protective device having:

sensor means for detecting an operating state of the electrical consumer;

an electronic evaluation and control unit operatively connected to the sensor means for evaluating and controlling the operating state of the electrical consumer detected by the sensor means;

a protective switch responsive to the operating state of the electrical consumer detected by the sensor means for interrupting the consumer circuit, the protective switch comprising:

a housing including housing walls;

a control circuit disposed at least in part within the housing and including a bimetallic strip and a temperature-dependent resistor operatively associated with the bimetallic strip for deflecting the bimetallic strip for interrupting the consumer circuit, the bimetallic strip thereby defining a deflecting direction; and a power supply unit adapted to be connected to a power supply grid and to respective ones of the sensor means, the evaluation and control unit, and the protective switch for supplying electrical power to the sensor means, the evaluation and control unit and the protective switch;

the improvement wherein the protective switch further comprises a spring disposed for biasing the bimetallic strip and the temperature-dependent resistor toward one another in the deflection direction of the bimetallic strip for effecting a structural and electrical contact between the bimetallic strip and the temperature-dependent resistor, the bimetallic strip thereby being electrically connected in series with the temperature-dependent resistor, a control current thereby being adapted to flow through the temperature-dependent resistor and the bimetallic strip.

2. The protective device according to claim 1, wherein the electrical consumer is at least one of a rotary pump motor, a canned motor pump motor, or a fan motor.

3. The protective device according to claim 1, further including a positive temperature coefficient resistor for limiting an input current from the power supply grid to the power supply unit.

4. The protective device according to claim 1, wherein the sensor means include a temperature sensor for detecting a temperature of the electrical consumer.

5. The protective device according to claim 1, wherein the sensor means include one of a shunt, a Hall element, and a current transformer for detecting a current flowing through the electrical consumer.

6. The protective device according to claim 1, wherein the sensor means is connected to one of a microprocessor and an ASIC for outputting a signal for interrupting the consumer circuit.

7. The protective device according to claim 1, wherein the protective switch further includes a warning means for emitting a warning signal when the consumer circuit is interrupted.

8. The protective device according to claim 1, wherein the bimetallic-strip rests directly on the temperature-dependent resistor.

9. The protective device according to claim 1, wherein the temperature-dependent resistor is a positive temperature coefficient resistor.

10. The protective device according to claim 1, wherein the bimetallic strip and the temperature-dependent resistor contact one another at respective contact surfaces thereof, the contact surfaces of the bimetallic strip and the temperature-dependent resistor being substantially parallel with respect to one another.

11. The protective device according to claim 1, wherein the spring is a compression spring electrically contactingly abutting a surface of the temperature-dependent resistor, the spring thereby being electrically connected in series with the temperature-dependent resistor and the bimetallic strip.

12. The protective device according to claim 1, wherein:
the control circuit of the protective switch further includes a connection contact electrically connected to the power supply unit; and
the spring is a helical spring having a first end abutting the temperature-dependent resistor, and a second end disposed opposite the first end and electrically contacting the connection contact of the control circuit.

13. The protective device according to claim 1, wherein the bimetallic strip includes two diametrically opposed sides fixedly supported within the housing of the protective switch and a contact surface disposed between the two diametrically opposed sides, the bimetallic strip contacting the temperature-dependent resistor at the contact surface thereof.

14. The protective device according to claim 13, wherein the protective switch further includes two spring tongues disposed at respective ones of the two diametrically opposed sides of the bimetallic strip for exerting diametrically opposed spring pressure on the diametrically opposed sides of the bimetallic strip for retaining the bimetallic strip within the housing of the protective switch.

15. The protective device according to claim 13, wherein the protective switch further includes a contact bracket having two spring tongues extending therefrom, the contact bracket being disposed within the housing of the protective switch such that the two spring tongues are disposed at respective ones of the two diametrically opposed sides of the bimetallic strip for exerting diametrically opposed spring pressure on the diametrically opposed sides of the bimetallic strip for retaining the bimetallic strip within the housing of the protective switch.

16. The protective device according to claim 14, wherein each of the two spring tongues includes a notch-shaped side region, the two diametrically opposed sides of the bimetallic strip being blade-like and resting within respective ones of the notch-shaped side regions of the two spring tongues.

17. The protective device according to claim 1, wherein the consumer circuit includes at least one contact bridge and a contact element associated therewith, the at least one contact bridge being biased in a contact closing direction for establishing contact with the contact element for effecting a consumer current flow in the consumer circuit, the contact closing direction being opposite to the deflection direction of the bimetallic strip, the at least one contact bridge thereby defining a contact closing position and being disposed such that a deflection of the bimetallic strip in the deflection direction disengages the at least one contact bridge from the contact element whereby the at least one contact bridge is moved into a contact opening position, the deflection direction of the bimetallic strip thereby corresponding to a contact opening direction of the at least one contact bridge.

18. The protective device according to claim 17 wherein the protective switch further includes a slide disposed between the bimetallic strip and the at least one contact bridge for transmitting a deflection of the bimetallic strip to the at least one contact bridge, the slide thereby having a contact opening position corresponding to the contact opening position of the at least one contact bridge.

19. The protective device according to claim 18, wherein the slide is supported on the housing of the protective switch.

20. The protective device according to claim 18, wherein the slide is movable in both the contact closing direction and the contact opening direction of the at least one contact bridge.

21. The protective device according to claim 17, wherein the at least one contact bridge is a contact spring biased in the contact closing direction.

22. The protective device according to claim 21, wherein the contact spring is fixedly fastened to the housing of the protective switch.

23. The protective device according to claim 18, wherein the at least one contact bridge includes a plurality of contact bridges disposed side by side, the protective switch thereby being a multi-pole protective switch, the contact bridges being adapted to be disengaged in unison from corresponding contact elements thereof by the slide.

24. The protective device according to claim 23, wherein the contact bridges are parallel to one another.

25. The protective device according to claim 18, wherein the protective switch further includes:
a locking device operatively associated with the at least one contact bridge and the slide for moving in a locking direction into a locking position for keeping the at least one contact bridge and the slide in their contact opening positions after the at least one contact bridge and the slide have been moved into their contact opening positions; and
a lock spring operatively associated with the locking device for biasing the locking device into its locking position.

26. The protective device according to claim 25, wherein:
the slide includes a slide recess therein for receving the locking device; and
the locking device is a lock pin supported on the housing and adapted to be received within the slide recess when the lock pin is in its locking position.

27. The protective device according to claim 26, wherein the lock spring is a leaf spring supported on one of the housing walls of the housing.

28. The protective device according to claim 27, wherein:
the lock pin includes a first end disposed adjacent the slide and a second end disposed opposite the first end;
the lock spring is U-shaped and includes a first leg and a second leg, the lock spring being fastened on the one of the housing walls at an outer side of the first leg thereof, the lock spring further being adapted to contact the second end of the lock pin at an outer side of the second leg thereof.

29. The protective device according to claim 26, wherein:
one of the housing walls defines an opening therein; and
the protective switch further includes:
- a cantilever operatively connected to the lock pin and extending at approximately right angles from the locking direction thereof; and
- a pressure tappet having a pushbutton oriented in the locking direction and protruding from the opening of the housing wall such that a pushbutton actuation thereof unlocks the lock pin from its locking position and thereby compresses the lock spring.

30. In a protective circuit including:
a consumer circuit having an electrical consumer disposed therein, the electrical consumer including a terminal box; and
a protective device disposed inside the terminal box of the electrical consumer and having:
- sensor means for detecting an operating state of the electrical consumer;
- an electronic evaluation and control unit operatively connected to the sensor means for evaluating and controlling the operating state of the electrical consumer detected by the sensor means;
- a protective switch responsive to the operating state of the electrical consumer detected by the sensor means for interrupting the consumer circuit, the protective switch comprising:
  - a housing including housing walls;
  - a control circuit disposed at least in part within the housing and including a bimetallic strip and a temperature-dependent resistor operatively associated with the bimetallic strip for deflecting the bimetallic strip for interrupting the consumer circuit, the bimetallic strip thereby defining a deflecting direction; and
  - a power supply unit adapted to be connected to a power supply grid and to respective ones of the sensor means, the evaluation and control unit, and the protective switch for supplying electrical power to the sensor means, the evaluation and control unit and the protective switch;

the improvement wherein the protective switch further comprises a spring disposed for biasing the bimetallic strip and the temperature-dependent resistor toward one another in the deflection direction of the bimetallic strip for effecting a structural and electrical contact between the bimetallic strip and the temperature-dependent resistor, the bimetallic strip thereby being electrically connected in series with the temperature-dependent resistor, a control current thereby being adapted to flow through the temperature-dependent resistor and the bimetallic strip.

* * * * *